United States Patent
Yoshikawa et al.

(10) Patent No.: US 11,966,075 B2
(45) Date of Patent: Apr. 23, 2024

(54) OPTICAL MEMBER AND BACKLIGHT UNIT USING SAID OPTICAL MEMBER, AND IMAGE DISPLAY DEVICE

(71) Applicant: NITTO DENKO CORPORATION, Ibaraki (JP)

(72) Inventors: Takahiro Yoshikawa, Ibaraki (JP); Daisuke Hattori, Ibaraki (JP); Ryota Morishima, Ibaraki (JP); Atsushi Kishi, Ibaraki (JP)

(73) Assignee: NITTO DENKO CORPORATION, Ibaraki (JP)

( * ) Notice: Subject to any disclaimer, the term of this patent is extended or adjusted under 35 U.S.C. 154(b) by 0 days.

(21) Appl. No.: 17/914,397

(22) PCT Filed: Mar. 26, 2021

(86) PCT No.: PCT/JP2021/012770
§ 371 (c)(1),
(2) Date: Sep. 26, 2022

(87) PCT Pub. No.: WO2021/193895
PCT Pub. Date: Sep. 30, 2021

(65) Prior Publication Data
US 2023/0110580 A1    Apr. 13, 2023

(30) Foreign Application Priority Data
Mar. 27, 2020    (JP) .................. 2020-057907

(51) Int. Cl.
*F21V 8/00* (2006.01)
*G02F 1/13357* (2006.01)

(52) U.S. Cl.
CPC ......... *G02B 6/0088* (2013.01); *G02B 6/0055* (2013.01); *G02F 1/133615* (2013.01); *G02F 2202/28* (2013.01)

(58) Field of Classification Search
CPC ................ G02B 6/0088; G02B 6/0055; G02F 1/133615; G02F 2202/28; G02F 1/1336;
(Continued)

(56) References Cited

U.S. PATENT DOCUMENTS 8,033,706 B1 * 10/2011 Kelly .................. G02B 6/0043
362/617
10,502,891 B2    12/2019 Araki et al.
(Continued)

FOREIGN PATENT DOCUMENTS

JP    H10-062626 A    3/1998
JP    2018-124409 A    8/2018
(Continued)

OTHER PUBLICATIONS

English Translation of International Search Report dated May 18, 2021, issued in counterpart International application No. PCT/JP2021/012770. (2 pages).
(Continued)

*Primary Examiner* — Tsion Tumebo
(74) *Attorney, Agent, or Firm* — WHDA, LLP (57) ABSTRACT

There is provided an optical member that can achieve a backlight unit excellent in brightness uniformity. The optical member includes: a light guide plate having an end surface that light from a light source enters, an emitting surface from which the entered light is emitted, and a light extraction pattern arranged on a surface opposite to the emitting surface; and a reflective plate bonded to the light guide plate via a double-sided pressure-sensitive adhesive film. An outer edge of the light guide plate is positioned outside an outer edge of the double-sided pressure-sensitive adhesive film, and the outer edge of the double-sided pressure-sensitive adhesive film is positioned outside an outer edge of the light extraction pattern.

3 Claims, 2 Drawing Sheets

(58) Field of Classification Search
CPC ........ C08J 5/12; F21S 2/00; C09J 7/38; F21V 9/40; F21V 17/00; F21V 2200/20; F21Y 2103/00; F21Y 2115/10
See application file for complete search history.

(56) References Cited

U.S. PATENT DOCUMENTS

| | | | |
|---|---|---|---|
| 11,402,569 B2 | 8/2022 | Hattori et al. | |
| 2008/0075895 A1* | 3/2008 | Yamaki | G02B 1/18 428/1.33 |
| 2008/0285304 A1* | 11/2008 | Rankin, Jr. | G02B 6/0036 362/602 |
| 2011/0170184 A1* | 7/2011 | Wolk | G02B 6/0065 359/625 |
| 2012/0287677 A1* | 11/2012 | Wheatley | G02B 6/0068 362/627 |
| 2013/0170218 A1* | 7/2013 | Wolk | G02B 6/005 362/296.01 |
| 2015/0277011 A1* | 10/2015 | Nakamura | G02B 5/045 359/489.07 |
| 2017/0227705 A1 | 8/2017 | Araki et al. | |
| 2017/0293194 A1* | 10/2017 | Hou | G02F 1/167 |
| 2017/0341336 A1* | 11/2017 | Haruta | B32B 37/14 |
| 2018/0281352 A1* | 10/2018 | Aoki | B32B 17/10348 |
| 2019/0086729 A1* | 3/2019 | Saito | G02F 1/133606 |
| 2020/0116921 A1 | 4/2020 | Hattori et al. | |

FOREIGN PATENT DOCUMENTS

| | | |
|---|---|---|
| KR | 10-2017-0133757 A | 12/2017 |
| WO | 2016/031397 A1 | 3/2016 |
| WO | 2016/204234 A1 | 12/2016 |

OTHER PUBLICATIONS

Extended (Supplementary) European Search Report dated Mar. 4, 2024, issued in counterpart EP application No. 21775504.0. (7 pages).

* cited by examiner

OPTICAL MEMBER AND BACKLIGHT UNIT USING SAID OPTICAL MEMBER, AND IMAGE DISPLAY DEVICE

TECHNICAL FIELD

The present invention relates to an optical member, and a backlight unit and an image display apparatus each using the optical member.

BACKGROUND ART

There has been known a technology including laminating a light guide plate and a reflective plate through intermediation of a low-refractive index layer in the backlight unit of an image display apparatus (typically, a liquid crystal display apparatus). It has been reported that according to such technology, the intermediation of the low-refractive index layer improves light utilization efficiency as compared to that in the case where the plates are simply laminated only with a pressure-sensitive adhesive. However, according even to such technology, light from a light source is emitted near a surface that the light enters, and hence brightness uniformity is not sufficient in some cases.

CITATION LIST

Patent Literature

[PTL 1] JP 10-62626 A

SUMMARY OF INVENTION

Technical Problem

The present invention has been made to solve the above-mentioned conventional problem, and a primary object of the present invention is to provide an optical member that can achieve a backlight unit excellent in brightness uniformity.

Solution to Problem

An optical member according to one embodiment of the present invention includes: a light guide plate having an end surface that light from a light source enters, an emitting surface from which the entered light is emitted, and a light extraction pattern arranged on a surface opposite to the emitting surface; and a reflective plate bonded to the light guide plate via a double-sided pressure-sensitive adhesive film. The double-sided pressure-sensitive adhesive film includes a first pressure-sensitive adhesive layer, a low-refractive index layer, and a second pressure-sensitive adhesive layer in the stated order from a light guide plate side. An outer edge of the light guide plate is positioned outside an outer edge of the double-sided pressure-sensitive adhesive film, and the outer edge of the double-sided pressure-sensitive adhesive film is positioned outside an outer edge of the light extraction pattern.

In one embodiment, when a maximum of a distance between the outer edge of the light guide plate and the outer edge of the light extraction pattern is represented by A, and a maximum of a distance between the outer edge of the light guide plate and the outer edge of the double-sided pressure-sensitive adhesive film is represented by B, a relationship of A>2B is satisfied.

According to another aspect of the present invention, there is provided a backlight unit. The backlight unit includes: a light source; the optical member as described above arranged so that the end surface faces the light source; and a casing configured to store the light source and the optical member.

According to still another aspect of the present invention, there is provided an image display apparatus. The image display apparatus includes: the backlight unit as described above; and an image display panel arranged on an emitting surface side of the light guide plate.

Advantageous Effects of Invention

According to the present invention, the optical member in which the light guide plate and the reflective plate are integrated with each other via the double-sided pressure-sensitive adhesive film including the low-refractive index layer is configured so that the outer edge of the light guide plate is positioned outside the outer edge of the double-sided pressure-sensitive adhesive film, and the outer edge of the double-sided pressure-sensitive adhesive film is positioned outside the outer edge of the light extraction pattern of the light guide plate. Thus, the backlight unit excellent in brightness uniformity can be achieved.

DESCRIPTION OF EMBODIMENTS

Embodiments of the present invention are described below. However, the present invention is not limited to these embodiments.

A. Overall Configuration of Optical Member

Figure 1:
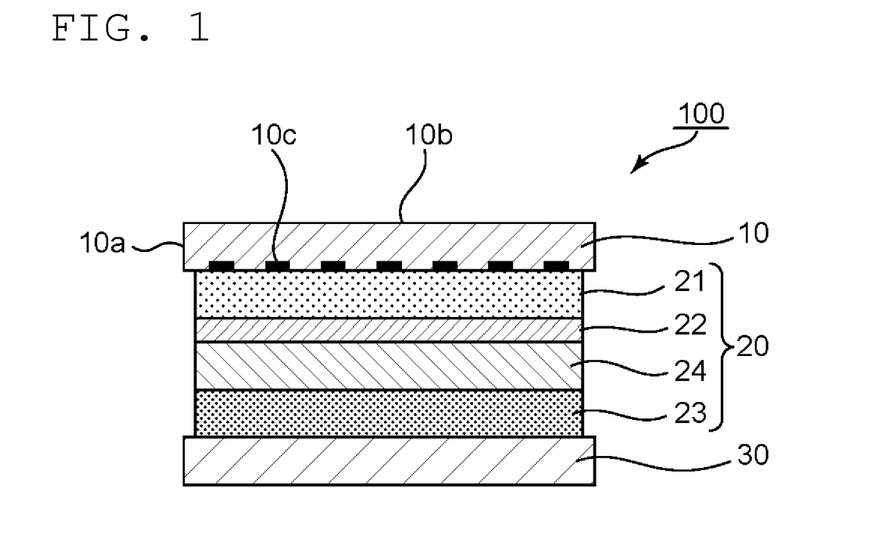
FIG. 1 is a schematic sectional view of an optical member according to one embodiment of the present invention.

FIG. 1 is a schematic sectional view of an optical member according to one embodiment of the present invention. An optical member 100 of the illustrated example includes a light guide plate 10 and a reflective plate 30 bonded to the light guide plate 10 via a double-sided pressure-sensitive adhesive film 20. The double-sided pressure-sensitive adhesive film 20 includes a first pressure-sensitive adhesive layer 21, a low-refractive index layer 22, and a second pressure-sensitive adhesive layer 23 from the light guide plate 10 side. Practically, a substrate 24 is arranged between the low-refractive index layer 22 and the second pressure-sensitive adhesive layer 23. More specifically, the low-refractive index layer 22 may be formed on the surface of the substrate 24, and the first pressure-sensitive adhesive layer 21 and the second pressure-sensitive adhesive layer 23 may be arranged on both the sides of the laminate of the substrate 24 and the low-refractive index layer 22.

The light guide plate 10 has an end surface 10*a* that light from a light source enters, an emitting surface 10*b* from which the entered light is emitted, and a light extraction pattern 10*c* arranged on a surface opposite to the emitting surface 10*b*. That is, the light guide plate 10 is typically an edge light system in which the light enters from the end surface 10a. More specifically, the light guide plate 10 guides the light that has entered the end surface 10a from the light source toward an end portion opposite to the end surface 10a while subjecting the light to a reflective action or the like therein, and in the light guide process, the plate gradually emits the light from the emitting surface 10b. The light extraction pattern 10c may contribute to the reflective action or the like in the light guide. The light extraction pattern is, for example, a white dot or an uneven shape. The light extraction pattern 10c may be formed by, for example, printing such as silk printing, injection molding, laser processing, or embossing. An emission pattern is typically arranged on the emitting surface 10b. The emission pattern is, for example, an uneven shape. The light guide plate 10 is typically a plate-like product including a thermoplastic resin, a thermosetting resin, or a photocurable resin. Examples of the resin for forming the light guide plate include a (meth)acrylic resin, a polycarbonate-based resin, a cyclic olefin-based resin, a styrene-based resin, and copolymer resins thereof.

Any appropriate reflective plate may be used as the reflective plate 30. For example, the reflective plate may be a mirror-surface reflective plate, or may be a diffusing reflective plate. Specific examples of the reflective plate include: a resin sheet having a high reflectance (e.g., an acrylic plate); a metal thin plate or metal foil made of aluminum, stainless steel, or the like; a deposited sheet obtained by depositing aluminum, silver, or the like from the vapor onto a substrate such as a resin film made of polyester or the like; a laminate of a substrate such as a resin film made of polyester or the like and metal foil made of aluminum or the like; and a resin film having formed therein voids. The arrangement of the reflective plate 30 can improve light utilization efficiency in a backlight unit.

Figure 2:
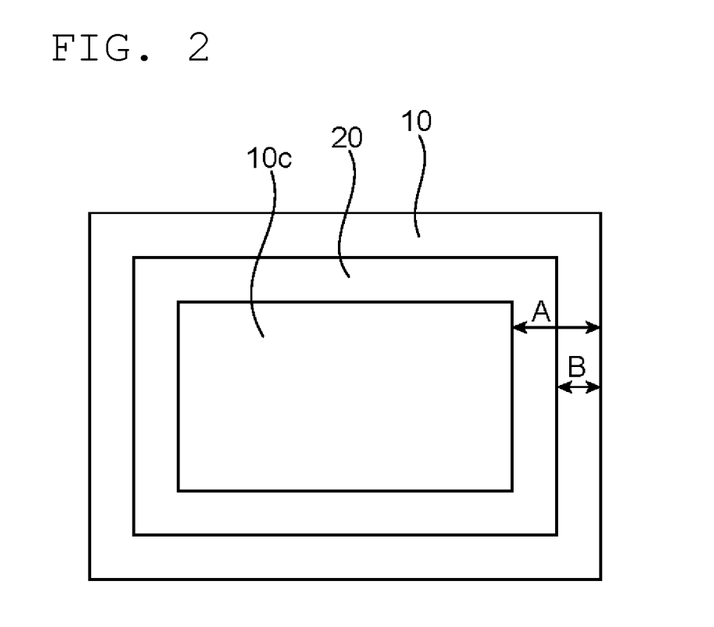
FIG. 2 is a schematic plan view for illustrating a relationship among the outer edge of a light guide plate, the outer edge of a double-sided pressure-sensitive adhesive film, and the outer edge of a light extraction pattern in the optical member according to the embodiment of the present invention.

In the embodiment of the present invention, as illustrated in FIG. 2, the outer edge of the light guide plate 10 is positioned outside the outer edge of the double-sided pressure-sensitive adhesive film 20, and the outer edge of the double-sided pressure-sensitive adhesive film 20 is positioned outside the outer edge of the light extraction pattern 10c of the light guide plate 10. In other words, the optical member is configured so that the outer edge of the double-sided pressure-sensitive adhesive film 20 does not protrude from the outer edge of the light guide plate 10, and the outer edge of the light extraction pattern 10c does not protrude from the outer edge of the double-sided pressure-sensitive adhesive film 20. Such configuration significantly suppresses light leakage, and as a result, can provide an optical member that can achieve a backlight unit excellent in brightness uniformity.

As illustrated in FIG. 2, the light guide plate 10 and the double-sided pressure-sensitive adhesive film 20 each typically have a rectangular shape in plan view. Although the light extraction pattern 10c has a predetermined pattern when viewed in plan, the outer edge of its patterned region may be substantially defined as a rectangular shape as illustrated in FIG. 2. In one embodiment, the length of the long side of the light guide plate 10 is longer than the length of the long side of the double-sided pressure-sensitive adhesive film 20, and the length of the short side of the light guide plate 10 is longer than the length of the short side of the double-sided pressure-sensitive adhesive film 20. In addition, the length of the long side of the double-sided pressure-sensitive adhesive film 20 is longer than the length of the long side of the light extraction pattern 10c, and the length of the short side of the double-sided pressure-sensitive adhesive film 20 is longer than the length of the short side of the light extraction pattern 10c. Such configuration can satisfactorily prevent such protrusion of each of the outer edges as described above. That is, in the case where the light guide plate 10 and the double-sided pressure-sensitive adhesive film 20, and/or the double-sided pressure-sensitive adhesive film 20 and the light extraction pattern 10c have the same size, even when the position at which the light guide plate and the reflective plate are bonded to each other is shifted only slightly, such protrusion of each of the outer edges as described above may occur. However, the adjustment of the sizes of the plate, the film, and the pattern can satisfactorily prevent the protrusion. In one embodiment, when the maximum of a distance between the outer edge of the light guide plate 10 and the outer edge of the light extraction pattern 10c is represented by A (mm), and the maximum of a distance between the outer edge of the light guide plate 10 and the outer edge of the double-sided pressure-sensitive adhesive film 20 is represented by B (mm), the optical member satisfies a relationship of A>2B. Such configuration can more satisfactorily prevent such protrusion of each of the outer edges as described above.

The double-sided pressure-sensitive adhesive film is described in detail below. Description for the light guide plate and the reflective plate except the foregoing is omitted because configurations well-known in the art may be adopted for the plates.

B. Double-Sided Pressure-Sensitive Adhesive Film B-1. Outline of Double-Sided Pressure-Sensitive Adhesive Film As described in the section A, the double-sided pressure-sensitive adhesive film includes the first pressure-sensitive adhesive layer 21, the low-refractive index layer 22, and practically, the substrate 24, and the second pressure-sensitive adhesive layer 23 from the light guide plate 10 side. The porosity of the low-refractive index layer 22 is, for example, 40 vol % or more. The storage modulus of elasticity of the first pressure-sensitive adhesive layer at 23° C. is, for example, from $1.0 \times 10^5$ (Pa) to $1.0 \times 10^7$ (Pa), and the storage modulus of elasticity of the second pressure-sensitive adhesive layer at 23° C. is, for example, $1.0 \times 10^5$ (Pa) or less. When the storage modulus of elasticity of the first pressure-sensitive adhesive layer adjacent to the low-refractive index layer is set to be high as described above, the pressure-sensitive adhesive of the layer can be prevented from entering the pores of the low-refractive index layer. Accordingly, the refractive index of the low-refractive index layer is maintained low, and the lowering effect can be maintained. Further, when the storage modulus of elasticity of the second pressure-sensitive adhesive layer that is the other pressure-sensitive adhesive layer is set to be low as described above, the breakage of the low-refractive index layer due to the vibration of the optical member can be suppressed. The suppressing effect on the breakage of the low-refractive index layer due to the vibration becomes particularly significant when the optical member is used in on-vehicle applications and/or amusement applications.

In one embodiment, the ratio of the thickness of the low-refractive index layer to the total thickness of the pressure-sensitive adhesive layers present in the double-sided pressure-sensitive adhesive film is, for example, from 0.10% to 5.00%, preferably from 0.11% to 4.50%, more preferably from 0.12% to 4.00%. When the thickness ratio falls within such ranges, the breakage of the low-refractive index layer due to the vibration can be more satisfactorily suppressed. More specifically, although large vibration is present not only in a longitudinal direction but also in a lateral direction in on-vehicle applications and/or amusement applications, the breakage of the low-refractive index layer particularly poor in strength in the lateral direction can be satisfactorily suppressed.

B-2. Substrate

The substrate may be typically formed of a film or plate-shaped product of a resin (preferably a transparent resin). Typical examples of such resin include a thermoplastic resin and a reactive resin (e.g., an ionizing radiation-curable resin). Specific examples of the thermoplastic resin include: a (meth)acrylic resin, such as polymethyl methacrylate (PMMA) or polyacrylonitrile; a polycarbonate (PC) resin; a polyester resin such as PET; a cellulose-based resin such as triacetyl cellulose (TAC); a cyclic polyolefin-based resin; and a styrene-based resin. Specific examples of the ionizing radiation-curable resin include an epoxy acrylate-based resin and a urethane acrylate-based resin. Those resins may be used alone or in combination thereof.

The thickness of the substrate is, for example, from 10 μm to 100 μm, preferably from 10 μm to 50 μm.

The refractive index of the substrate is preferably 1.47 or more, more preferably from 1.47 to 1.60, still more preferably from 1.47 to 1.55. When the refractive index falls within such ranges, light extracted from the light guide plate can be introduced into an image display cell without being adversely affected.

B-3. Low-Refractive Index Layer

The low-refractive index layer typically has pores therein. The porosity of the low-refractive index layer is 40 vol % or more as described above, and is typically 50 vol % or more, preferably 70 vol % or more, more preferably 80 vol % or more. Meanwhile, the porosity is, for example, 90 vol % or less, preferably 85 vol % or less. When the porosity falls within the ranges, the refractive index of the low-refractive index layer can be set within an appropriate range. The porosity is a value calculated from the value of the refractive index measured with an ellipsometer by using Lorentz-Lorenz's formula.

The refractive index of the low-refractive index layer is preferably 1.30 or less, more preferably 1.20 or less, still more preferably 1.15 or less. The lower limit of the refractive index may be, for example, 1.01. When the refractive index falls within such ranges, extremely excellent light utilization efficiency can be achieved in the laminated structure of the light guide plate and the peripheral member obtained via the optical laminate with pressure-sensitive adhesive layers on both sides. The refractive index refers to a refractive index measured at a wavelength of 550 nm unless otherwise stated. The refractive index is a value measured by a method described in the section "(1) Refractive Index of Low-refractive Index Layer" in Examples below.

Any appropriate configuration may be adopted for the low-refractive index layer as long as the layer has the above-mentioned desired porosity and refractive index. The low-refractive index layer may be preferably formed through, for example, application or printing. Materials described in, for example, WO 2004/113966 A1, JP 2013-254183 A, and JP 2012-189802 A may each be adopted as a material for forming the low-refractive index layer. Specific examples thereof include: silica-based compounds; hydrolyzable silanes, and partial hydrolysates and dehydration condensates thereof; organic polymers; silanol group-containing silicon compounds; active silica obtained by bringing a silicate into contact with an acid or an ion-exchange resin; polymerizable monomers (e.g., a (meth) acrylic monomer and a styrene-based monomer); curable resins (e.g., a (meth)acrylic resin, a fluorine-containing resin, and a urethane resin); and combinations thereof. The low-refractive index layer may be formed by, for example, applying or printing a solution or a dispersion liquid of such material.

The size of each of the pores (holes) in the low-refractive index layer refers to a major axis diameter out of the major axis diameter and minor axis diameter of the pore (hole). The sizes of the pores (holes) are, for example, from 2 nm to 500 nm. The sizes of the pores (holes) are, for example, 2 nm or more, preferably 5 nm or more, more preferably 10 nm or more, still more preferably 20 nm or more. Meanwhile, the sizes of the pores (holes) are, for example, 500 nm or less, preferably 200 nm or less, more preferably 100 nm or less. The range of the sizes of the pores (holes) is, for example, from 2 nm to 500 nm, preferably from 5 nm to 500 nm, more preferably from 10 nm to 200 nm, still more preferably from 20 nm to 100 nm. The sizes of the pores (holes) may be adjusted to desired sizes in accordance with, for example, a purpose and an application. The sizes of the pores (holes) may be quantified by a BET test method.

The sizes of the pores (holes) may be quantified by a BET test method. Specifically, 0.1 g of the sample (formed pore layer) is loaded into the capillary of a specific surface area-measuring apparatus (manufactured by Micromeritics Instrument Corporation, ASAP 2020), and is then dried under reduced pressure at room temperature for 24 hours so that a gas in its pore structure may be removed. Then, an adsorption isotherm is drawn by causing the sample to adsorb a nitrogen gas, and its pore size distribution is determined. Thus, the pore sizes may be evaluated.

The haze of the low-refractive index layer is, for example, less than 5%, preferably less than 3%. Meanwhile, the haze is, for example, 0.1% or more, preferably 0.2% or more. The range of the haze is, for example, 0.1% or more and less than 5%, preferably 0.2% or more and less than 3%. The haze is an indicator of the transparency of the low-refractive index layer, and may be measured by, for example, such a method as described below.

The pore layer (low-refractive index layer) is cut into a size measuring 50 mm by 50 mm, and is set in a haze meter (manufactured by Murakami Color Research Laboratory Co., Ltd.: HM-150), followed by the measurement of its haze. The haze value is calculated from the following equation.

$$\text{Haze } (\%) = [\text{diffuse transmittance } (\%)/\text{total light transmittance } (\%)] \times 100(\%)$$

The low-refractive index layer having the pores therein is, for example, a low-refractive index layer having a porous layer and/or an air layer in at least part thereof. The porous layer typically contains aerogel and/or particles (e.g., hollow fine particles and/or porous particles). The low-refractive index layer may be preferably a nanoporous layer (specifically a porous layer in which the diameters of 90% or more of micropores fall within the range of from $10^{-1}$ nm to $10^3$ nm).

Any appropriate particles may be adopted as the particles. The particles are each typically formed of a silica-based compound. Examples of the shapes of the particles include a spherical shape, a plate shape, a needle shape, a string shape, and a botryoidal shape. String-shaped particles are, for example, particles in which a plurality of particles each having a spherical shape, a plate shape, or a needle shape are strung together like beads, short fiber-shaped particles (e.g., short fiber-shaped particles described in JP 2001-188104 A), and a combination thereof. The string-shaped particles may be linear or may be branched. Botryoidal-shaped particles are, for example, particles in which a plurality of spherical, plate-shaped, and needle-shaped particles aggregate to form a botryoidal shape. The shapes of the particles may be identified through, for example, observation with a transmission electron microscope.

The thickness of the low-refractive index layer is preferably from 0.2 µm to 5 µm, more preferably from 0.3 µm to 3 µm. When the thickness of the low-refractive index layer falls within such ranges, a damage-preventing effect exhibited by the present invention becomes significant. Further, the above-mentioned desired thickness ratio can be easily achieved.

An example of a specific configuration of the low-refractive index layer is described below. The low-refractive index layer of this embodiment is formed of one or a plurality of kinds of constituent units each forming a fine pore structure, and the constituent units are chemically bonded to each other through a catalytic action. Examples of the shape of each of the constituent units include a particle shape, a fiber shape, a rod shape, and a flat plate shape. The constituent units may have only one shape, or may have two or more shapes in combination. In the following description, a case in which the low-refractive index layer is a pore layer of a porous body in which the microporous particles are chemically bonded to each other is mainly described.

Such pore layer may be formed by, for example, chemically bonding the microporous particles to each other in a pore layer-forming step. In the embodiment of the present invention, the shapes of the "particles" (e.g., the microporous particles) are not particularly limited. For example, the shapes may each be a spherical shape, or may each be any other shape. In addition, in the embodiment of the present invention, the microporous particles may be, for example, sol-gel beaded particles, nanoparticles (hollow nanosilica nanoballoon particles), or nanofibers. The microporous particles each typically contain an inorganic substance. Specific examples of the inorganic substance include silicon (Si), magnesium (Mg), aluminum (Al), titanium (Ti), zinc (Zn), and zirconium (Zr). Those inorganic substances may be used alone or in combination thereof. In one embodiment, the microporous particles are, for example, microporous particles of a silicon compound, and the porous body is, for example, a silicone porous body. The microporous particles of the silicon compound each contain, for example, a pulverized body of a gel-like silica compound. In addition, another form of the low-refractive index layer having a porous layer and/or an air layer in at least part thereof is, for example, a pore layer having the following features: the layer is formed of fibrous substances such as nanofibers; and the fibrous substances are entangled with each other to form pores, thereby forming the layer. A method of producing such pore layer is not particularly limited, and is the same as that in the case of, for example, the pore layer of the porous body in which the microporous particles are chemically bonded to each other. Still another form thereof is, for example, a pore layer using hollow nanoparticles or nanoclay, or a pore layer formed by using hollow nanoballoons or magnesium fluoride. The pore layer may be a pore layer formed of a single constituent substance, or may be a pore layer formed of a plurality of constituent substances. The pore layer may include any one of the above-mentioned forms, or may include two or more of the above-mentioned forms.

In this embodiment, the porous structure of the porous body may be, for example, an open-cell structural body in which hole structures are continuous with each other. The open-cell structural body means, for example, that the hole structures are three-dimensionally continuous with each other in the silicone porous body, and can be said to be a state in which the internal pores of the hole structures are continuous with each other. When the porous body has an open-cell structure, its porosity can be increased. However, when closed-cell particles (particles each individually having a hole structure) such as hollow silica are used, an open-cell structure cannot be formed. Meanwhile, for example, when silica sol particles (pulverized products of a gel-like silicon compound that forms sol) are used, the particles each have a three-dimensional dendritic structure, and hence the dendritic particles are sedimented and deposited in a coating film (coating film of the sol containing the pulverized products of the gel-like silicon compound). Accordingly, an open-cell structure can be easily formed. The low-refractive index layer more preferably has a monolith structure in which an open-cell structure includes a plurality of pore size distributions. The monolith structure means, for example, a hierarchical structure including a structure in which nanosized fine pores are present and an open-cell structure in which the nanosized pores assemble. When the monolith structure is formed, both of film strength and a high porosity may be achieved by, for example, imparting the high porosity to the layer through use of a coarse open-cell pore while imparting the film strength thereto through use of a fine pore. Such monolith structure may be preferably formed by controlling the pore size distribution of a pore structure to be produced in the gel (gel-like silicon compound) at a stage before its pulverization into the silica sol particles. In addition, the monolith structure may be formed by, for example, controlling the particle size distribution of the silica sol particles after the pulverization to a desired size at the time of the pulverization of the gel-like silicon compound.

The low-refractive index layer contains, for example, the pulverized products of a gel-like compound as described above, and the pulverized products are chemically bonded to each other. The form of the chemical bond (chemical bonding) between the pulverized products in the low-refractive index layer is not particularly limited, and examples thereof include a cross-linking bond, a covalent bond, and a hydrogen bond.

The volume-average particle diameter of the pulverized products in the low-refractive index layer is, for example, 0.10 µm or more, preferably 0.20 µm or more, more preferably 0.40 µm or more. Meanwhile, the volume-average particle diameter is, for example, 2.00 µm or less, preferably 1.50 µm or less, more preferably 1.00 µm or less. The range of the volume-average particle diameter is, for example, from 0.10 µm to 2.00 µm, preferably from 0.20 µm to 1.50 µm, more preferably from 0.40 µm to 1.00 µm. The particle size distribution of the pulverized products may be measured with, for example, a particle size distribution-evaluating apparatus based on a dynamic light scattering method, a laser diffraction method, or the like, and an electron microscope, such as a scanning electron microscope (SEM) or a transmission electron microscope (TEM). The volume-average particle diameter is an indicator of a variation in particle size of the pulverized products.

The kind of the gel-like compound is not particularly limited. The gel-like compound is, for example, a gel-like silicon compound.

In addition, in the low-refractive index layer (pore layer), for example, silicon atoms to be incorporated preferably form a siloxane bond. As a specific example, the ratio of unbonded silicon atoms (in other words, residual silanol groups) out of all the silicon atoms in the pore layer is, for example, less than 50%, preferably 30% or less, more preferably 15% or less.

An example of a method of forming such low-refractive index layer is described below.

The method typically includes: a precursor-forming step of forming a pore structure, which is a precursor of the low-refractive index layer (pore layer), on a resin film; and a cross-linking reaction step of causing a cross-linking reaction in the precursor after the precursor-forming step. The method further includes: a containing liquid-producing step of producing a containing liquid containing microporous particles (hereinafter sometimes referred to as "microporous particle-containing liquid" or simply "containing liquid"); and a drying step of drying the containing liquid. In the precursor-forming step, the microporous particles in a dried body are chemically bonded to each other to form the precursor. The containing liquid is not particularly limited, and is, for example, a suspension containing the microporous particles. In the following, a case in which the microporous particles are pulverized products of the gel-like compound, and the pore layer is a porous body (preferably a silicone porous body) containing the pulverized products of the gel-like compound is mainly described. However, even when the microporous particles are products other than the pulverized products of the gel-like compound, the low-refractive index layer may be similarly formed.

According to the above-mentioned method, for example, a low-refractive index layer (pore layer) having an extremely low refractive index is formed. A reason for the foregoing is assumed to be, for example, as described below. However, the assumption does not limit the method of forming the low-refractive index layer.

The above-mentioned pulverized products are obtained by pulverizing the gel-like silicon compound, and hence a state in which the three-dimensional structure of the gel-like silicon compound before the pulverization is dispersed in a three-dimensional basic structure is established. Further, in the above-mentioned method, the application of the crushed products of the gel-like silicon compound onto the resin film results in the formation of the precursor of a porous structure based on the three-dimensional basic structure. In other words, according to the method, a new porous structure (three-dimensional basic structure) different from the three-dimensional structure of the gel-like silicon compound is formed by the application of the pulverized products. Accordingly, in the pore layer to be finally obtained, such a low refractive index that the layer functions to the same extent as, for example, an air layer may be achieved. Further, in the method, the three-dimensional basic structure is fixed because the pulverized products are chemically bonded to each other. Accordingly, the pore layer to be finally obtained can maintain sufficient strength and sufficient flexibility despite the fact that the layer is a structure having pores.

Details about specific configurations of the low-refractive index layer and the method of forming the low-refractive index layer are described in, for example, WO 2019/151073 A1, the description of which is incorporated herein by reference.

B-4. First Pressure-Sensitive Adhesive Layer

The first pressure-sensitive adhesive layer has such hardness that under a normal state, a pressure-sensitive adhesive for forming the first pressure-sensitive adhesive layer does not permeate the pores of the low-refractive index layer. The storage modulus of elasticity of the first pressure-sensitive adhesive layer at 23° C. is from $1.0 \times 10^5$ (Pa) to $1.0 \times 10^7$ (Pa) as described above. The storage modulus of elasticity is, for example, $1.1 \times 10^5$ (Pa) or more, $1.2 \times 10^5$ (Pa) or more, $1.3 \times 10^5$ (Pa) or more, $1.4 \times 10^5$ (Pa) or more, $1.5 \times 10^5$ (Pa) or more, $1.6 \times 10^5$ (Pa) or more, $1.7 \times 10^5$ (Pa) or more, $1.8 \times 10^5$ (Pa) or more, $1.9 \times 10^5$ (Pa) or more, or $2.0 \times 10^5$ (Pa) or more, and $1.0 \times 10^7$ (Pa) or less, $5.0 \times 10^6$ (Pa) or less, $1.0 \times 10^6$ (Pa) or less, or $5.0 \times 10^5$ (Pa) or less. The storage modulus of elasticity is preferably from $1.3 \times 10^5$ (Pa) to $1.0 \times 10^6$ (Pa), more preferably from $1.5 \times 10^5$ (Pa) to $5.0 \times 10^5$ (Pa). The storage modulus of elasticity is determined by reading a value at 23° C. at the time of measurement in conformity with a method described in JIS K 7244-1 "Plastics-Determination of dynamic mechanical properties" under the condition of a frequency of 1 Hz in the range of from −50° C. to 150° C. at a rate of temperature increase of 5° C./min.

Any appropriate pressure-sensitive adhesive may be used as the pressure-sensitive adhesive for forming the first pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition typically contains a (meth)acrylic polymer as a main component (base polymer). The (meth)acrylic polymer may be incorporated into the pressure-sensitive adhesive composition at a ratio of, for example, 50 wt % or more, preferably 70 wt % or more, more preferably 90 wt % or more in the solid content of the pressure-sensitive adhesive composition. The (meth)acrylic polymer contains, as a main component, an alkyl (meth)acrylate serving as a monomer unit. The term "(meth)acrylate" refers to an acrylate and/or a methacrylate. The alkyl group of the alkyl (meth)acrylate is, for example, a linear or branched alkyl group having 1 to 18 carbon atoms. The average number of carbon atoms of the alkyl group is preferably from 3 to 9. As a monomer for forming the (meth)acrylic polymer, in addition to the alkyl (meth)acrylate, there are given comonomers, such as a carboxyl group-containing monomer, a hydroxyl group-containing monomer, an amide group-containing monomer, an aromatic ring-containing (meth)acrylate, and a heterocycle-containing (meth)acrylate. The comonomer is preferably a hydroxyl group-containing monomer and/or a heterocycle-containing (meth)acrylate, more preferably N-acryloylmorpholine. The acrylic pressure-sensitive adhesive composition may preferably contain a silane coupling agent and/or a cross-linking agent. The silane coupling agent is, for example, an epoxy group-containing silane coupling agent. The cross-linking agent is, for example, an isocyanate-based cross-linking agent or a peroxide-based cross-linking agent. Details about such pressure-sensitive adhesive layer or acrylic pressure-sensitive adhesive composition are described in, for example, JP 4140736 B2, the description of which is incorporated herein by reference.

The thickness of the first pressure-sensitive adhesive layer is preferably from 3 μm to 30 μm, more preferably from 5 μm to 10 μm. When the thickness of the first pressure-sensitive adhesive layer falls within such ranges, the following advantage is obtained: an influence of the thickness of the pressure-sensitive adhesive layer on the entire thickness of the optical member is small while the layer has a sufficient adhesive strength. Further, the above-mentioned desired thickness ratio can be easily achieved.

B-5. Second Pressure-Sensitive Adhesive Layer

The second pressure-sensitive adhesive layer includes any appropriate pressure-sensitive adhesive. In one embodiment, the second pressure-sensitive adhesive layer includes a pressure-sensitive adhesive having such softness as to be capable of absorbing the transfer of the vibration to suppress the breakage of the low-refractive index layer. The storage modulus of elasticity of the second pressure-sensitive adhesive layer at 23° C. is, for example, $1.0 \times 10^5$ (Pa) or less as described above, and is, for example, $1.0 \times 10^5$ (Pa) or less, $9.5 \times 10^4$ (Pa) or less, $9.0 \times 10^4$ (Pa) or less, $8.5 \times 10^4$ (Pa) or less, $8.0 \times 10^4$ (Pa) or less, $7.5 \times 10^4$ (Pa) or less, or $7.0 \times 10^4$ (Pa) or less, and $1.0 \times 10^3$ (Pa) or more, $5.0 \times 10^3$ (Pa) or more, $1.0 \times 10^4$ (Pa) or more, or $5.0 \times 10^4$ (Pa) or more. The storage modulus of elasticity is preferably from $5.0 \times 10^3$ (Pa) to $9.0 \times 10^4$ (Pa), more preferably from $1.0 \times 10^4$ (Pa) to $8.5 \times 10^4$ (Pa).

Any appropriate pressure-sensitive adhesive may be used as the pressure-sensitive adhesive for forming the second pressure-sensitive adhesive layer as long as the pressure-sensitive adhesive has such characteristic as described above. The pressure-sensitive adhesive is typically, for example, an acrylic pressure-sensitive adhesive (acrylic pressure-sensitive adhesive composition). The acrylic pressure-sensitive adhesive composition is as described in the section B-4. However, the pressure-sensitive adhesive for forming the second pressure-sensitive adhesive layer is preferably free of a heterocycle-containing (meth)acrylate as a comonomer. In addition, the weight-average molecular weight Mw of a base polymer in the pressure-sensitive adhesive composition is preferably 2,000,000 or less, more preferably from 5,000 to 1,600,000. Details about the second pressure-sensitive adhesive layer or the acrylic pressure-sensitive adhesive composition for forming the second pressure-sensitive adhesive layer are described in, for example, JP 2016-190996A, the description of which is incorporated herein by reference.

The thickness of the second pressure-sensitive adhesive layer is preferably from 5 μm to 300 μm, more preferably from 10 μm to 200 μm. When the thickness of the second pressure-sensitive adhesive layer falls within such ranges, impact is alleviated particularly at the time of the vibration of the optical member in a lateral direction, and hence damage to the low-refractive index layer can be reduced. In addition, strain in a configuration occurring at the time of the assembly of an image display apparatus is reduced, and as a result, brightness unevenness at the time of image display can be reduced. Further, the above-mentioned desired thickness ratio can be easily achieved.

C. Backlight Unit

Figure 3:
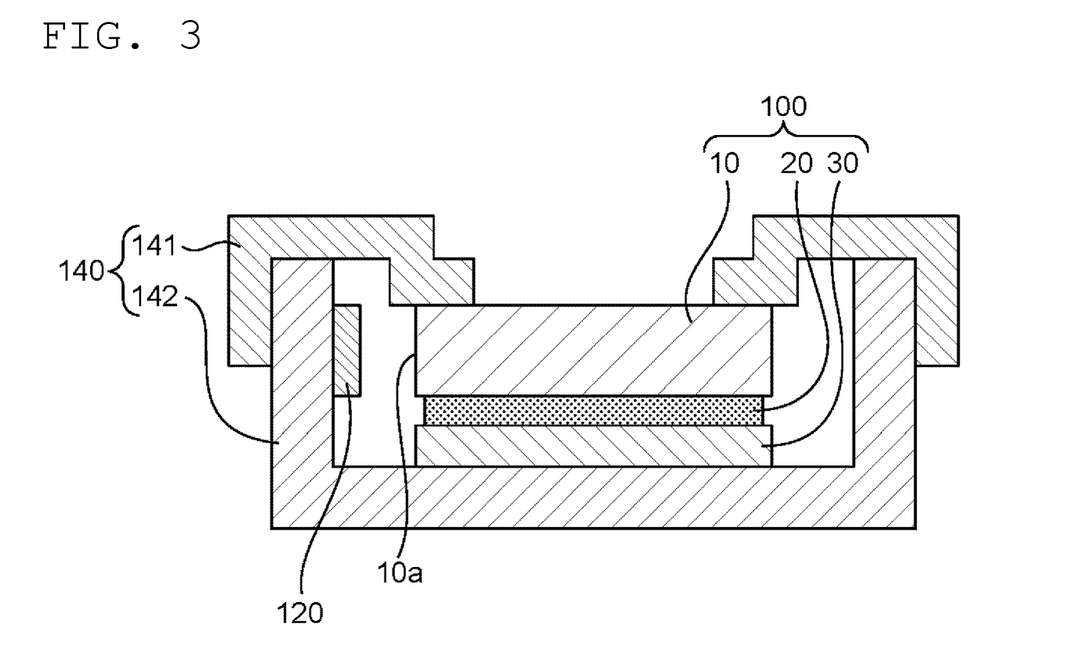
FIG. 3 is a schematic sectional view of a backlight unit according to one embodiment of the present invention.

The optical member described in the section A and the section B may be suitably used in a backlight unit (in particular, an edge light-type backlight unit). Accordingly, the embodiment of the present invention also encompasses such backlight unit. FIG. 3 is a schematic sectional view of the backlight unit according to one embodiment of the present invention. A backlight unit 200 includes: a light source 120; the optical member 100 described in the section A and the section B, the member being arranged so that the end surface 10a of the light guide plate 10 faces the light source 120; and a casing 140 for storing the light source 120 and the optical member 100.

The light source 120 is arranged on one end portion side of the light guide plate 10 to face the end surface 10a of the light guide plate. Accordingly, the backlight unit is typically an edge light system. The light source 120 is typically surrounded by a reflector (not shown). Any appropriate configuration may be adopted as the light source. Specific examples thereof include a light emitting diode (LED), a cold cathode fluorescent lamp (CCFL), an external electrode fluorescent lamp (EEFL), and a hot cathode fluorescent lamp (HCFL). In one embodiment, an LED light source may be used. The LED light source may be typically formed by arranging LEDs (point light sources) in a line.

The casing 140 has a front portion 141 and a back portion 142, and stores the light source 120 and the optical member 100. The back portion 142 has a box shape whose upper portion (front surface side) is opened, and in a pair of end portions of the back portion 142 opposing each other, the front portion 141 protrudes inward from the back portion. The front portion 141 and the back portion 142 are typically fixed to and integrated with each other. Such configuration enables the casing 140 to fit the optical member 100 thereinto.

D. Image Display Apparatus

The backlight unit described in the section C may be suitably used in an image display apparatus (e.g., a liquid crystal display). Accordingly, the embodiment of the present invention also encompasses such image display apparatus. The image display apparatus includes the backlight unit described in the section C and an image display panel arranged on the emitting surface side of the light guide plate of the unit.

EXAMPLES

Now, the present invention is specifically described by way of Examples. However, the present invention is not limited to these Examples. Measurement methods for characteristics are as described below. In addition, unless otherwise specified, "%" and "part(s)" in Examples are by weight.

(1) Refractive Index of Low-Refractive Index Layer

After a low-refractive index layer had been formed on an acrylic film, the resultant was cut into a size measuring 50 mm by 50 mm, and the piece was bonded to the front surface of a glass plate (thickness: 3 mm) via a pressure-sensitive adhesive layer. A central portion (having a diameter of about 20 mm) on the rear surface of the glass plate was daubed with a black marker pen. Thus, a sample in which light was not reflected on the rear surface of the glass plate was obtained. The sample was set in an ellipsometer (manufactured by J. A. Woollam Japan: VASE), and its refractive index was measured under the conditions of a wavelength of 550 nm and an incident angle of from 50° to 80°.

(2) Brightness Uniformity

Each of backlight units obtained in Examples and Comparative Example was lit, and its brightness uniformity was visually observed. The uniformity was evaluated by the following criteria.

○: The brightness of the backlight unit is uniform over the entirety thereof.

×: Light leakage is observed, and the brightness is non-uniform.

[Production Example 1] Preparation of Coating Liquid for Forming Low-Refractive Index Layer (1) Gelation of Silicon Compound 0.95 g of methyltrimethoxysilane (MTMS) that was a precursor of a silicon compound was dissolved in 2.2 g of dimethyl sulfoxide (DMSO). Thus, a mixed liquid A was prepared. 0.5 g of a 0.01 mol/L aqueous solution of oxalic acid was added to the mixed liquid A, and the mixture was stirred at room temperature for 30 minutes so that MTMS was hydrolyzed. Thus, a mixed liquid B containing tris(hydroxy)methylsilane was produced.

0.38 g of 28 wt % ammonia water and 0.2 g of pure water were added to 5.5 g of DMSO, and then the mixed liquid B was further added to the mixture, followed by stirring at room temperature for 15 minutes to perform the gelation of tris(hydroxy)methylsilane. Thus, a mixed liquid C containing a gel-like silicon compound was obtained.

(2) Aging Treatment

Aging treatment was performed by incubating the mixed liquid C containing the gel-like silicon compound, which had been prepared as described above, as it was at 40° C. for 20 hours.

(3) Pulverization Treatment

Next, the gel-like silicon compound subjected to the aging treatment as described above was crushed into granular shapes each having a size of from several millimeters to several centimeters with a spatula. Next, 40 g of isopropyl alcohol (IPA) was added to the mixed liquid C, and the mixture was lightly stirred. After that, the mixture was left at rest at room temperature for 6 hours so that the solvent and the catalyst in the gel were decanted. Similar decantation treatment was performed three times to replace the solvent with IPA. Thus, a mixed liquid D was obtained. Next, the gel-like silicon compound in the mixed liquid D was subjected to pulverization treatment (high-pressure media-less pulverization). The pulverization treatment (high-pressure media-less pulverization) was performed as follows: a homogenizer (manufactured by SMT Co., Ltd., product name: "UH-50") was used, and 1.85 g of the gel-like silicon compound and 1.15 g of IPA in the mixed liquid D were weighed in a 5-cubic centimeter screw bottle, followed by the performance of the pulverization of the mixture under the conditions of 50 W and 20 kHz for 2 minutes.

The gel-like silicon compound in the mixed liquid D was pulverized by the pulverization treatment, and hence the mixed liquid was turned into a sol liquid of the pulverized products (a mixed liquid D'). A volume-average particle diameter representing a variation in particle size of the pulverized products in the mixed liquid D' was determined to be from 0.50 to 0.70 with a dynamic light scattering-type nanotrack particle size analyzer (manufactured by Nikkiso Co., Ltd., model UPA-EX150). Further, a methyl ethyl ketone (MEK) solution of a photobase generator (Wako Pure Chemical Industries, Ltd.: product name: WPBG-266) having a concentration of 1.5 wt % and a MEK solution of bis(trimethoxysilyl)ethane having a concentration of 5% were added at ratios of 0.062 g and 0.036 g, respectively to 0.75 g of the sol liquid (mixed liquid D'). Thus, a coating liquid for forming a low-refractive index layer was obtained.

[Production Example 2] Preparation of Pressure-Sensitive Adhesive for Forming First Pressure-Sensitive Adhesive Layer 90.7 Parts of butyl acrylate, 6 parts of N-acryloylmorpholine, 3 parts of acrylic acid, 0.3 part of 2-hydroxybutyl acrylate, and 0.1 part by weight of 2,2'-azobisisobutyronitrile serving as a polymerization initiator were loaded into a four-necked flask including a stirring blade, a temperature gauge, a nitrogen gas-introducing tube, and a condenser together with 100 g of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.2 Part of an isocyanate cross-linking agent (CORONATE L manufactured by Nippon Polyurethane Industry Co., Ltd., tolylene diisocyanate adduct of trimethylolpropane), 0.3 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive solution. Next, the acrylic pressure-sensitive adhesive solution was applied to one surface of a silicone-treated polyethylene terephthalate (PET) film (manufactured by Mitsubishi Chemical Polyester Film Co., Ltd., thickness: 38 μm) so that the thickness of a pressure-sensitive adhesive layer after drying became 20 μm, followed by drying at 150° C. for 3 minutes. Thus, the pressure-sensitive adhesive layer was formed. The resultant pressure-sensitive adhesive layer had a storage modulus of elasticity of $1.3 \times 10^5$ (Pa).

[Production Example 3] Preparation of Pressure-Sensitive Adhesive for Forming Second Pressure-Sensitive Adhesive Layer 99 Parts of butyl acrylate, 1 part of 4-hydroxybutyl acrylate, and 0.1 part of 2,2'-azobisisobutyronitrile serving as a polymerization initiator were loaded into a four-necked flask including a stirring blade, a temperature gauge, a nitrogen gas-introducing tube, and a condenser together with 100 parts of ethyl acetate, and a nitrogen gas was introduced to purge the flask with nitrogen while the mixture was gently stirred. After that, a liquid temperature in the flask was kept at around 55° C., and a polymerization reaction was performed for 8 hours to prepare an acrylic polymer solution. 0.1 Part of an isocyanate cross-linking agent (TAKENATE D110N manufactured by Mitsui Takeda Chemicals Inc., trimethylolpropane xylylene diisocyanate), 0.1 part of benzoyl peroxide (NYPER BMT manufactured by Nippon Oil & Fats Co., Ltd.), and 0.2 part of γ-glycidoxypropylmethoxysilane (manufactured by Shin-Etsu Chemical Co., Ltd.: KBM-403) were blended into 100 parts of the solid content of the resultant acrylic polymer solution to prepare an acrylic pressure-sensitive adhesive composition solution. Next, the acrylic pressure-sensitive adhesive composition solution was applied to one surface of a polyethylene terephthalate film treated with a silicone-based releasing agent (separator film: manufactured by Mitsubishi Chemical Polyester Film Co., Ltd., MRF 38), and was dried at 150° C. for 3 minutes to form a pressure-sensitive adhesive layer having a thickness of 20 μm on the surface of the separator film. The resultant pressure-sensitive adhesive layer had a storage modulus of elasticity of $8.2 \times 10^4$ (Pa).

[Production Example 4] Production of Double-Sided Pressure-Sensitive Adhesive Film The coating liquid for forming a low-refractive index layer prepared in Production Example 1 was applied to a substrate having a thickness of 30 μm (acrylic film). The wet thickness (thickness before drying) of the coating layer was about 27 μm. The coating layer was treated at a temperature of 100° C. for 1 minute to be dried. Thus, a low-refractive index layer (thickness: 0.9 μm) was formed on the substrate. The resultant low-refractive index layer had a porosity of 56% and a refractive index of 1.15. Next, a first pressure-sensitive adhesive layer (thickness: 10 μm) including the pressure-sensitive adhesive prepared in Production Example 2 was formed on the surface of the low-refractive index layer. Further, a second pressure-sensitive adhesive layer (thickness: 28 μm) including the pressure-sensitive adhesive prepared in Production Example 3 was formed on the surface of the substrate. Thus, a double-sided pressure-sensitive adhesive film, which had the configuration "first pressure-sensitive adhesive layer/low-refractive index layer/substrate/second pressure-sensitive adhesive layer," was produced.

Example 1

A backlight unit was taken out from a commercial liquid crystal display apparatus (manufactured by KING JIM Co., Ltd., product name: "XMC10"). A light guide plate was taken out from the backlight unit (substantially, its casing). Meanwhile, the double-sided pressure-sensitive adhesive film obtained in Production Example 4 was cut out so that its size became smaller than the size of the light guide plate, and became larger than the size of a light extraction pattern arranged on the light guide plate. Specifically, the cut-out double-sided pressure-sensitive adhesive film had a size measuring 119 mm by 176.5 mm, the light guide plate had a size measuring 120 mm by 179 mm, and the light extraction pattern (substantially, the outer edge of its patterned region) had a size measuring 117 mm by 173 mm. The light guide plate and a commercial reflective plate (manufactured by Toray Industries, Inc., product name: "LUMIRROR (trademark) #225 E6SR") were bonded to each other via the double-sided pressure-sensitive adhesive film cut out into the above-mentioned size to provide an optical member. At this time, the light guide plate was bonded to the first pressure-sensitive adhesive layer. In the bonding, none of the protrusion of the outer edge of the double-sided pressure-sensitive adhesive film from the outer edge of the light guide plate, and the protrusion of the outer edge of the light extraction pattern from the outer edge of the double-sided pressure-sensitive adhesive film was observed. The resultant optical member was incorporated into the casing again to produce a backlight unit. The resultant backlight unit was subjected to the above-mentioned evaluation (2). The result is shown in Table 1.

Comparative Example 1

An optical member and a backlight unit were produced in the same manner as in Example 1 except that the double-sided pressure-sensitive adhesive film was cut out into the same size as that of the light guide plate. In the bonding, the protrusion of the outer edge of the double-sided pressure-sensitive adhesive film from the outer edge of the light guide plate was observed. The resultant backlight unit was subjected to the same evaluation as that of Example 1. The result is shown in Table 1.

Comparative Example 2

An optical member and a backlight unit were produced in the same manner as in Example 1 except that the double-sided pressure-sensitive adhesive film was cut out into the same size as that of the light extraction pattern. In the bonding, the protrusion of the outer edge of the light extraction pattern from the outer edge of the double-sided pressure-sensitive adhesive film was observed. The resultant backlight unit was subjected to the same evaluation as that of Example 1. The result is shown in Table 1.

TABLE 1

| | Configuration | Protrusion | Brightness uniformity |
|---|---|---|---|
| Example 1 | Size of light guide plate > size of double-sided pressure-sensitive adhesive film > size of light extraction pattern | Absent | ○ |
| Comparative Example 1 | Size of light guide plate = size of double-sided pressure-sensitive adhesive film > size of light extraction pattern | Present | x |
| Comparative Example 2 | Size of light guide plate > size of double-sided pressure-sensitive adhesive film = size of light extraction pattern | Present | x |

As is apparent from Table 1, it is understood that according to Example of the present invention, a backlight unit excellent in brightness uniformity can be achieved as follows: the sizes of the light guide plate, the double-sided pressure-sensitive adhesive film, and the light extraction pattern of the light guide plate are adjusted to configure the unit so that the outer edge of the light guide plate is positioned outside the outer edge of the double-sided pressure-sensitive adhesive film, and the outer edge of the double-sided pressure-sensitive adhesive film is positioned outside the outer edge of the light extraction pattern of the light guide plate.

INDUSTRIAL APPLICABILITY

The optical member and the backlight unit of the present invention may each be suitably used as the backlight unit of an image display apparatus (in particular, a liquid crystal display apparatus).

REFERENCE SIGNS LIST 10 light guide plate
10a end surface
10b emitting surface
10c light extraction pattern
20 double-sided pressure-sensitive adhesive film
21 first pressure-sensitive adhesive layer
22 low-refractive index layer
23 second pressure-sensitive adhesive layer
24 substrate
30 reflective plate
100 optical member
120 light source
140 casing
141 front portion
142 back portion
200 backlight unit

The invention claimed is:
1. An optical member, comprising:
a light guide plate having an end surface that light from a light source enters, an emitting surface from which the entered light is emitted, and a light extraction pattern arranged on a surface opposite to the emitting surface; and
a reflective plate bonded to the light guide plate via a double-sided pressure-sensitive adhesive film,
wherein the double-sided pressure-sensitive adhesive film includes a first pressure-sensitive adhesive layer, a low-refractive index layer, and a second pressure-sensitive adhesive layer in the stated order from a light guide plate side, wherein an outer edge of the light guide plate is positioned outside an outer edge of the double-sided pressure-sensitive adhesive film, and the outer edge of the double-sided pressure-sensitive adhesive film is positioned outside an outer edge of the light extraction pattern, and when a maximum of a distance between the outer edge of the light guide plate and the outer edge of the light extraction pattern is represented by A, and a maximum of a distance between the outer edge of the light guide plate and the outer edge of the double-sided pressure-sensitive adhesive film is represented by B, a relationship of $A>2B$ is satisfied.

2. A backlight unit, comprising:

the light source;

the optical member of claim 1 arranged so that the end surface faces the light source; and a casing configured to store the light source and the optical member.

3. An image display apparatus, comprising:

the backlight unit of claim 2; and an image display panel arranged on an emitting surface side of the light guide plate.

\* \* \* \* \*